United States Patent
Pan

(10) Patent No.: US 10,983,304 B2
(45) Date of Patent: *Apr. 20, 2021

(54) IMAGING DEVICE, FOCUSING CONTROL METHOD, AND FOCUSING CONTROL PROGRAM

(71) Applicant: FUJIFILM Corporation, Tokyo (JP)

(72) Inventor: Yi Pan, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,818

(22) Filed: Jan. 22, 2020

(65) Prior Publication Data

US 2020/0158990 A1    May 21, 2020

Related U.S. Application Data

(63) Continuation of application No. 16/011,647, filed on Jun. 19, 2018, now Pat. No. 10,578,832, which is a (Continued)

(30) Foreign Application Priority Data

Dec. 22, 2015    (JP) .............................. JP2015-249618

(51) Int. Cl.
*G02B 7/36* (2021.01)
*G03B 13/36* (2021.01)
(Continued)

(52) U.S. Cl.
CPC ................. *G02B 7/36* (2013.01); *G02B 7/04* (2013.01); *G03B 3/10* (2013.01); *G03B 13/36* (2013.01);
(Continued)

(58) Field of Classification Search
CPC . G02B 7/04; G02B 7/36; G03B 13/36; G03B 17/14; G03B 3/10; H04N 5/2254; H04N 5/232; H04N 5/23212
See application file for complete search history.

(56) References Cited

U.S. PATENT DOCUMENTS 5,574,502 A    11/1996    Haruki
5,757,429 A    5/1998    Haruki
(Continued)

FOREIGN PATENT DOCUMENTS

CN    102647553    8/2012
CN    105100617    11/2015
(Continued)

OTHER PUBLICATIONS

Office Action of China Counterpart Application, with English translation thereof, dated Nov. 23, 2018, pp. 1-22.
(Continued)

*Primary Examiner* — Chiawei Chen
(74) *Attorney, Agent, or Firm* — JCIPRNET

(57) ABSTRACT

An imaging device includes: a lens including a focus lens capable of moving in an optical axis direction; an imaging element imaging a subject through the focus lens; and a processor controlling the focus lens and the imaging element and selectively performing one of acceleration and deceleration control such that a movement speed of the focus lens is decelerated after the movement speed is accelerated and constant speed control such that the movement speed of the focus lens is constant by controlling the movement speed based on evaluation values, lens performance information, and first imaging performance information so as to move the target lens to a target position.

19 Claims, 10 Drawing Sheets

Related U.S. Application Data continuation of application No. PCT/JP2016/082696, filed on Nov. 2, 2016.

(51) Int. Cl.
*H04N 5/232* (2006.01)
*G03B 3/10* (2021.01)
*G03B 17/14* (2021.01)
*G02B 7/04* (2021.01)
*H04N 5/225* (2006.01)

(52) U.S. Cl.
CPC .......... *G03B 17/14* (2013.01); *H04N 5/2254* (2013.01); *H04N 5/232* (2013.01); *H04N 5/23212* (2013.01)

(56) References Cited

U.S. PATENT DOCUMENTS

| | | | |
|---|---|---|---|
| 7,003,222 B1* | 2/2006 | Murakami | G02B 7/102 348/E5.04 |
| 2002/0051411 A1* | 5/2002 | Asakura | G11B 7/08517 369/44.28 |
| 2004/0057714 A1* | 3/2004 | Kashiwaba | G03B 13/36 396/135 |
| 2009/0284612 A1 | 11/2009 | Abe et al. | |
| 2009/0284643 A1 | 11/2009 | Shibuno et al. | |
| 2009/0285572 A1 | 11/2009 | Shibuno et al. | |
| 2011/0063472 A1 | 3/2011 | Kitahira et al. | |
| 2011/0063497 A1 | 3/2011 | Kawazoe et al. | |
| 2011/0080488 A1 | 4/2011 | Okamoto et al. | |
| 2011/0091194 A1 | 4/2011 | Isaka et al. | |
| 2012/0070139 A1 | 3/2012 | Shibuno et al. | |
| 2012/0211638 A1 | 8/2012 | Yoshida | |
| 2012/0212635 A1 | 8/2012 | Abe et al. | |
| 2012/0307109 A1* | 12/2012 | Morioka | H04N 21/8549 348/231.3 |
| 2012/0307131 A1 | 12/2012 | Isaka et al. | |
| 2014/0232856 A1 | 8/2014 | Yoshida | |
| 2014/0247384 A1* | 9/2014 | Hokkezu | H04N 5/232 348/345 |
| 2015/0116537 A1* | 4/2015 | Ariga | H04N 5/3532 348/226.1 |
| 2015/0185465 A1* | 7/2015 | Karube | G02B 21/082 348/79 |
| 2016/0006919 A1* | 1/2016 | Aoyama | G01J 1/28 348/226.1 |
| 2017/0041522 A1* | 2/2017 | Nakagawara | H04N 5/2357 |
| 2018/0081148 A1* | 3/2018 | Tomita | G02B 7/09 |

FOREIGN PATENT DOCUMENTS

| | | |
|---|---|---|
| CN | 105141852 | 12/2015 |
| JP | H01239514 | 9/1989 |
| JP | H077650 | 1/1995 |
| JP | 2007299007 | 11/2007 |
| JP | 2011128422 | 6/2011 |
| JP | 2012189742 | 10/2012 |
| JP | 2016109765 | 6/2016 |
| WO | 2009128263 | 10/2009 |

OTHER PUBLICATIONS

"International Search Report (Form PCT/ISA/210) of PCT/JP2016/082696", dated Feb. 7, 2017, with English translation thereof, pp. 1-5.

"Written Opinion of the International Searching Authority of PCT/JP2016/082696" with English translation thereof, dated Feb. 7, 2017, p. 1-p. 6.

\* cited by examiner

IMAGING DEVICE, FOCUSING CONTROL METHOD, AND FOCUSING CONTROL PROGRAM

CROSS REFERENCE TO RELATED APPLICATION

This application is a continuation of and claims the priority benefit of U.S. patent application Ser. No. 16/011,647, filed on Jun. 19, 2018, now allowable, which is a continuation of International Application No. PCT/JP2016/082696 filed on Nov. 2, 2016, and claims priority from Japanese Patent Application No. 2015-249618 filed on Dec. 22, 2015. The entire disclosures of which are incorporated herein by reference.

BACKGROUND OF THE INVENTION

1. Field of the Invention

The present invention relates to an imaging device, a focusing control method, and a computer readable medium storing a focusing control program.

2. Description of the Related Art

In recent years, with an increase in resolution of imaging elements, such as a charge coupled device (CCD) image sensor and a complementary metal oxide semiconductor (CMOS) image sensor, there has been a rapid increase in demand for information devices having an imaging function, such as a digital still camera, a digital video camera, and a smartphone. The information devices having an imaging function described above are referred to as imaging devices.

In these imaging devices, as a focusing control method which focuses on a main subject, a contrast auto focus (AF) method or a phase difference AF method is employed.

The contrast AF method is a method which calculates evaluation values of sharpness from captured image signals acquired in movement positions of a focus lens while moving the focus lens in an optical axis direction and determines a lens position having a highest evaluation value as a target position of the focus lens.

JP1995-7650A (JP-H7-7650A) describes an imaging device that performs focusing control through the contrast AF method.

In a case where the focus lens is moved in order to acquire the evaluation values, the imaging device performs acceleration and deceleration control such that the focus lens is moved at a high speed for a period during which a change in evaluation value is small and the focus lens is moved at a low speed for a period during which a change in focusing evaluation value is large. According to the acceleration and deceleration control, it is possible to increase the speed of the focusing control while securing focusing accuracy.

JP1989-239514A (JP-H1-239514A) describes a system that controls a movement speed of a focus lens in a case where the focus lens is moved in order to search for a target position based on information stored in an imaging device and information stored in a lens device attached to the imaging device.

JP2007-299997A describes an imaging device that controls a movement range of a focus lens in a case where the focus lens is moved in order to search for a target position.

SUMMARY OF THE INVENTION

In order to perform the focusing control at a high speed through the contrast AF method, the movement speed of the focus lens at the time of a search operation when the focus lens is moved from a nearest end to an infinity end in order to acquire the evaluation values may be increased.

However, even though only the movement speed of the focus lens is simply increased, in a case where an interval at which the captured image signals are sampled by the imaging element is long, the number of evaluation values capable of being calculated is reduced. Thus, determination accuracy of the target position is not able to be improved.

The increasing of the movement speed of the focus lens at the time of the search operation and the reducing of the sampling interval of the captured image signals during the movement of the focus lens (the increasing of the frame rate) are effective. However, in a case where the frame rate is increased, it is necessary to increase the movement speed of the focus lens with the increase in the frame rate.

As stated above, in a case where the movement speed becomes high, it takes a time to decelerate the movement speed after the movement speed is accelerated. Thus, as described in JP1995-7650A (JP-H7-7650A), in a case where the acceleration and deceleration control is performed, the movement speed of the focus lens may not be sufficiently decreased while the focus lens passes through a lens position in which the evaluation value is near the peak.

As a result, the number of evaluation values to be sampled is not able to be sufficiently secured near the lens position in which the evaluation value becomes the peak, and thus, the determination accuracy of the target position is deteriorated.

In order to improve the determination accuracy of the target position, after the focus lens is moved from the nearest end to the infinity end, it is necessary to increase the number of evaluation values to be sampled by performing control such that the focus lens is returned from the infinity end to the nearest end in a state in which a desired value (a value at which a sufficient number of evaluation values is acquired) is set as the movement speed of the focus lens. However, in a case where this control is performed, a time taken to complete the focusing control is prolonged.

Accordingly, in a case where the acceleration and deceleration control is performed, the combination of the movement speed of the focus lens during the search operation with the frame rate is optimized, and thus, it is important to set a balance between the focusing accuracy and the focusing speed to be in a best state.

However, in the imaging device to which the lens device is detachably attached, driving performance of the focus lens varies depending on the lens device, and a frame rate capable of being set varies depending on the imaging device.

Thus, the acceleration and deceleration control is performed in some combinations of the lens device with the imaging device, and thus, there are some cases where it is difficult to achieve both the high focusing accuracy and the increase in focusing speed.

JP1995-7650A (JP-H7-7650A) does not take account of the relationship between the frame rate and the movement speed of the focus lens or a case where the lens device is detachably attached.

The imaging device described in JP1989-239514A (JP-H1-239514A) does not change the movement speed of the focus lens at the time of the search operation.

The imaging device described in JP2007-299997A does not change the movement speed of the focus lens at the time of the search operation. This imaging device does not take account of the case where the lens device is detachably attached.

The present invention has been made in view of such circumstances, and an object of the present invention is to provide an imaging device, a focusing control method, and a focusing control program which are capable of constantly realizing focusing control at a high speed with high accuracy irrespective of being combined with a lens device.

An imaging device according to the present invention is an imaging device having a lens, an imaging element, and a processor. The lens includes a focus capable of moving in an optical axis direction. The imaging element that images a subject through the focus lens. The processor is configured to control the focus lens and the imaging element to acquire captured image signals by causing the imaging element to image the subject for each position of the focus lens while moving the focus lens, calculate evaluation values for determining a target position of the focus lens based on the captured image signals, determine the target position of the focus lens based on the evaluation values, acquire lens performance information indicating focusing performance of the focus lens from the lens, where one of acceleration and deceleration control are selectively performed such that a movement speed of the focus lens is decelerated after the movement speed is accelerated and constant speed control such that the movement speed of the focus lens is constant by controlling the movement speed based on the evaluation values, the lens performance information, and imaging performance information indicating number of captured image signals read out per unit time in a case where the captured image signals are continuously read out from the imaging element or a reading interval of the captured image signals so as to move the focus lens to the target position.

A focusing control method according to the present invention is a focusing control method using an imaging device having a lens including a focus lens capable of moving in an optical axis direction and having an imaging element which images a subject through the focus lens. The method includes a search control step of controlling the focus lens and the imaging element to acquire captured image signals by causing the imaging element to image the subject for each position of the focus lens while moving the focus lens, an evaluation value calculation step of calculating evaluation values for determining a target position of the focus lens based on the captured image signals, a target position determination step of determining the target position of the focus lens based on the evaluation values, and a lens information acquisition step of acquiring lens performance information indicating focusing performance of the focus lens from the lens. In the search control step, any one of acceleration and deceleration control such that a movement speed of the focus lens is decelerated after the movement speed is accelerated and constant speed control such that the movement speed of the focus lens is constant is selectively performed by controlling the movement speed based on the evaluation values, the lens performance information, and imaging performance information indicating the number of captured image signals read out per unit time in a case where the captured image signals are continuously read out from the imaging element or a reading interval of the captured image signals so as to move the focus lens to the target position.

A focusing control program according to the present invention is a program causing a computer included in an imaging device having a lens including a focus lens capable of moving in an optical axis direction and having an imaging element which images a subject through the focus lens to control the focus lens and the imaging element to acquire captured image signals by causing the imaging element to image the subject for each position of the focus lens while moving the focus lens, calculate evaluation values for determining a target position of the focus lens based on the captured image signals, determine the target position of the focus lens based on the evaluation values, acquire lens performance information indicating focusing performance of the focus lens from the lens, where one of acceleration and deceleration control are selectively performed such that a movement speed of the focus lens is decelerated after the movement speed is accelerated and constant speed control such that the movement speed of the focus lens is constant by controlling the movement speed based on the evaluation values, the lens performance information, and imaging performance information indicating number of captured image signals read out per unit time in a case where the captured image signals are continuously read out from the imaging element or a reading interval of the captured image signals so as to move the focus lens to the target position.

According to the present invention, it is possible to provide an imaging device, a focusing control method, and a focusing control program which are capable of constantly realizing focusing control at a high speed with high accuracy irrespective of being combined with a lens device.

DESCRIPTION OF THE PREFERRED EMBODIMENTS

Figure 1:
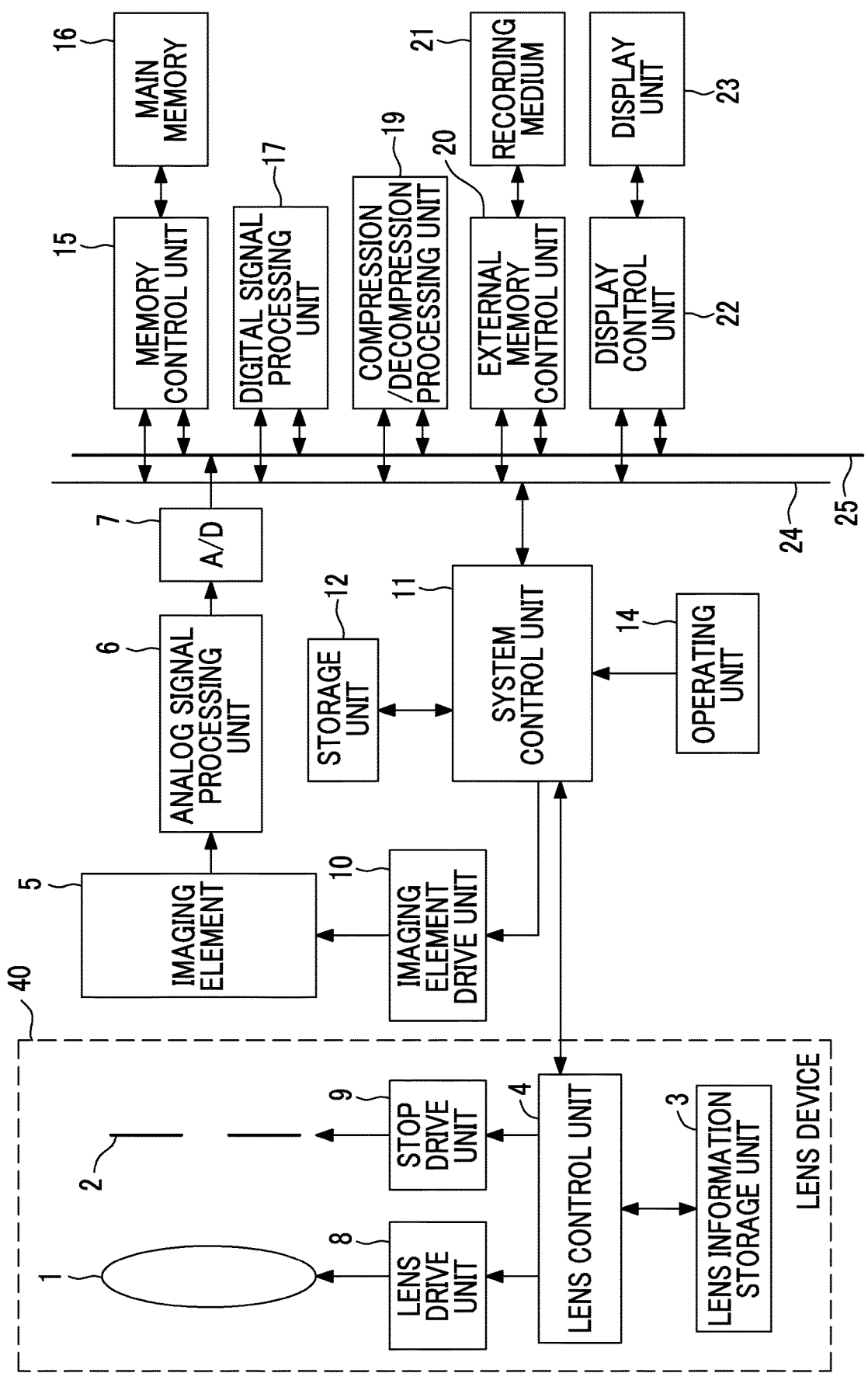
FIG. 1 is a diagram showing the schematic configuration of a digital camera as an example of an imaging device for describing an embodiment of the invention.

Hereinafter, an embodiment of the invention will be described by referring to the drawings.

FIG. 1 is a diagram showing the schematic configuration of a digital camera as an example of an imaging device for describing an embodiment of the invention.

The digital camera shown in FIG. 1 is an imaging device capable of detachably attaching a lens device 40 that has an imaging lens 1 including a focus lens for focus adjustment, a stop 2, a lens information storage unit 3, a lens control unit 4, a lens drive unit 8, and a stop drive unit 9.

The imaging lens 1 and the stop 2 of the lens device 40 constitute an imaging optical system. The imaging lens 1 includes at least the focus lens.

The focus lens is a lens that adjusts a focus position of the imaging optical system by moving in an optical axis direction. In a case where the imaging lens consisting of a plurality of lenses are all-group moving type lens, and all the groups are focus lenses.

The lens control unit 4 of the lens device 40 is able to communicate with a system control unit 11 of the digital camera in a wired or wireless manner.

The lens control unit 4 drives the focus lens included in the imaging lens 1 through the lens drive unit 8 or drives the stop 2 through the stop drive unit 9 according to a command from the system control unit 11.

Lens performance information indicating focusing performance of the lens device 40 is stored in the lens information storage unit 3 of the lens device 40. The lens performance information will be described.

The digital camera includes an imaging element 5 which images a subject through the imaging optical system of the lens device 40, such as a CCD type or CMOS type, an analog signal processing unit 6 which is connected to an output of the imaging element 5 and performs analog signal processing such as correlative double sampling processing, an analog-to-digital conversion circuit 7 which converts the analog signal output from the analog signal processing unit 6 into a digital signal, a storage unit 12, an imaging element drive unit 10, the system control unit 11, and an operating unit 14. The analog signal processing unit 6 and the analog-to-digital conversion circuit 7 are controlled by the system control unit 11.

The system control unit 11 that generally controls the entire electric control system of the digital camera drives the imaging element 5 through the imaging element drive unit 10, and outputs a subject image captured through the lens device 40, as captured image signals. A command signal from a user is input to the system control unit 11 through the operating unit 14.

The system control unit 11 moves the focus lens included in the imaging lens 1 through the lens control unit 4 and the lens drive unit 8. The system control unit 11 adjusts the amount of exposure by controlling the amount of aperture of the stop 2 through the lens control unit 4 and the stop drive unit 9.

A frame rate $f_{body}$ which is the number of captured image signals to be read out per unit time (for example, one second) in a case where a motion picture imaging is performed by the imaging element 5 and the captured image signals are continuously read out from the imaging element 5 is stored in the storage unit 12. The frame rate $f_{body}$ constitutes first imaging performance information.

The electric control system of the digital camera further includes a main memory 16 which includes a flash memory and a random access memory (RAM), a memory control unit 15 which is connected to the main memory 16, a digital signal processing unit 17 which generates captured image data by performing interpolation calculation, gamma correction calculation, and the like on the captured image signals output from the analog-to-digital conversion circuit 7, a compression/expansion processing unit 18 which compresses the captured image data generated by the digital signal processing unit 17 in a Joint Photographic Experts Group (JPEG) format or expands the compressed image data, an external memory control unit 20 to which a detachable recording medium 21 is connected, and a display control unit 22 to which a display unit 23 mounted on a camera rear surface or the like is connected.

The memory control unit 15, the digital signal processing unit 17, the compression/expansion processing unit 18, the external memory control unit 20, and the display control unit 22 are connected to one another by a control bus 24 and a data bus 25, and are controlled according to commands from the system control unit 11.

Figure 2:
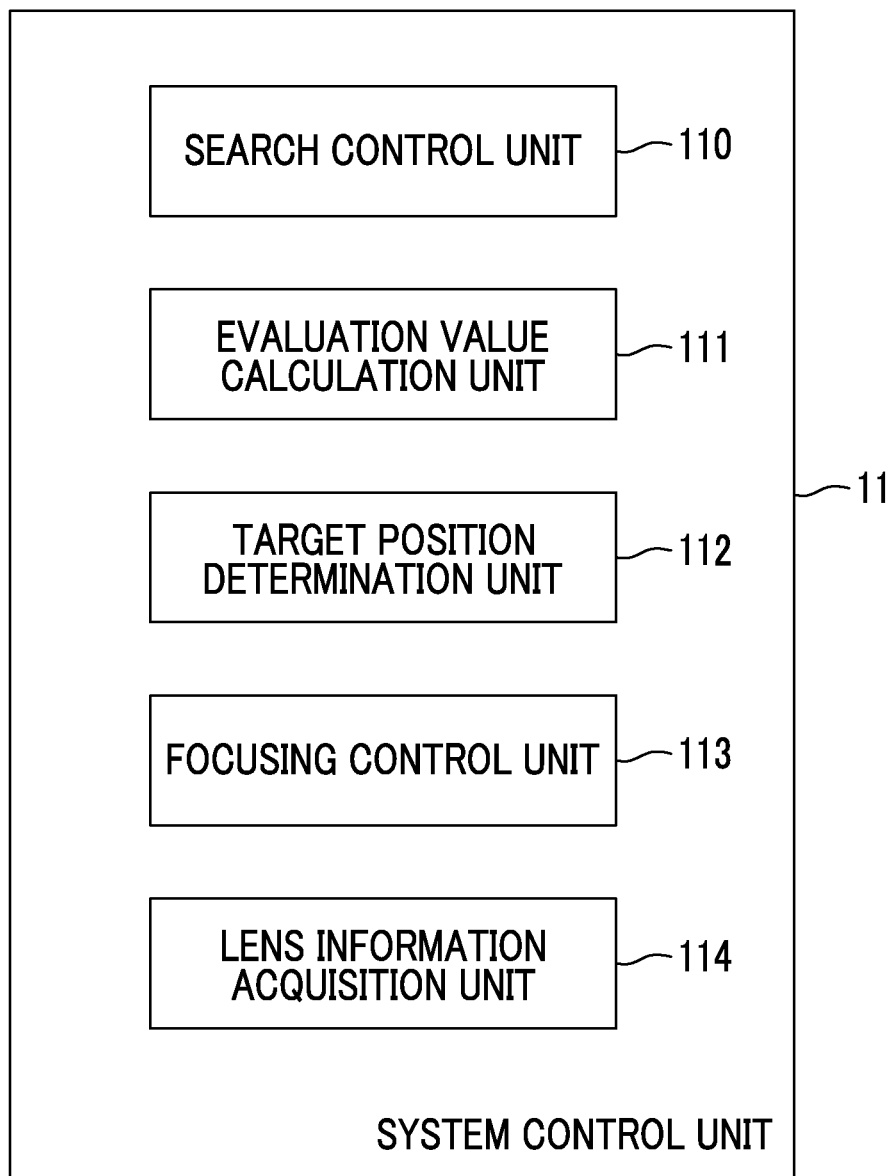
FIG. 2 is a functional block diagram of a system control unit 11 of the digital camera shown in FIG. 1.

FIG. 2 is a functional block diagram of the system control unit 11 in the digital camera shown in FIG. 1.

The system control unit 11 includes a search control unit 110, an evaluation value calculation unit 111, a target position determination unit 112, a focusing control unit 113, and a lens information acquisition unit 114.

These functional blocks are formed by a focusing control program being executed by a processor (computer) included in the system control unit 11. The system control unit 11 constitutes a focusing control device.

The search control unit 110 causes the imaging element 5 to image the subject for the positions of the focus lens while moving the focus lens by controlling the lens control unit 4, and acquires the captured image signals for the positions of the focus lens.

The evaluation value calculation unit 111 performs a filtering process on the captured image signals for the positions of the focus lens acquired by the search control unit 110, and calculates evaluation values for determining a target position of the focus lens based on the signals on which the filtering process has been performed. For example, the evaluation values are acquired by calculating contrast values of the captured image signals acquired by performing the filtering process.

The target position determination unit 112 determines the target position of the focus lens based on the evaluation values calculated for the positions of the focus lens by the evaluation value calculation unit 111.

For example, the target position determination unit 112 acquires an evaluation value curve indicating the relationship between the positions of the focus lens and the evaluation values for the subject to being captured from the plurality of evaluation values calculated by the evaluation value calculation unit 111, and determines the position of the focus lens corresponding to a maximum point of the evaluation value curve, as the target position.

Alternatively, the target position determination unit 112 determines the position of the focus lens at which a maximum evaluation value of the plurality of evaluation values is acquired, as the target position.

The focusing control unit 113 performs focusing control for moving the focus lens to the target position determined by the target position determination unit 112 by controlling the lens control unit 4.

The lens information acquisition unit 114 requests that the lens control unit 4 is to transmit the lens performance information stored in the lens information storage unit 3, and acquires the lens performance information transmitted from the lens control unit 4 according to the transmission request.

The search control unit 110 selectively performs any one of acceleration and deceleration control such that a movement speed of the focus lens is decelerated after the movement speed is accelerated and constant speed control such that the movement speed of the focus lens is constant, as driving control of the focus lens in a case where the focus lens is moved in order to calculate the evaluation value.

The search control unit 110 determines whether to perform the acceleration and deceleration control or the constant speed control based on the lens performance information acquired by the lens information acquisition unit 114 and the frame rate $f_{body}$ stored in the storage unit 12.

Figure 3:
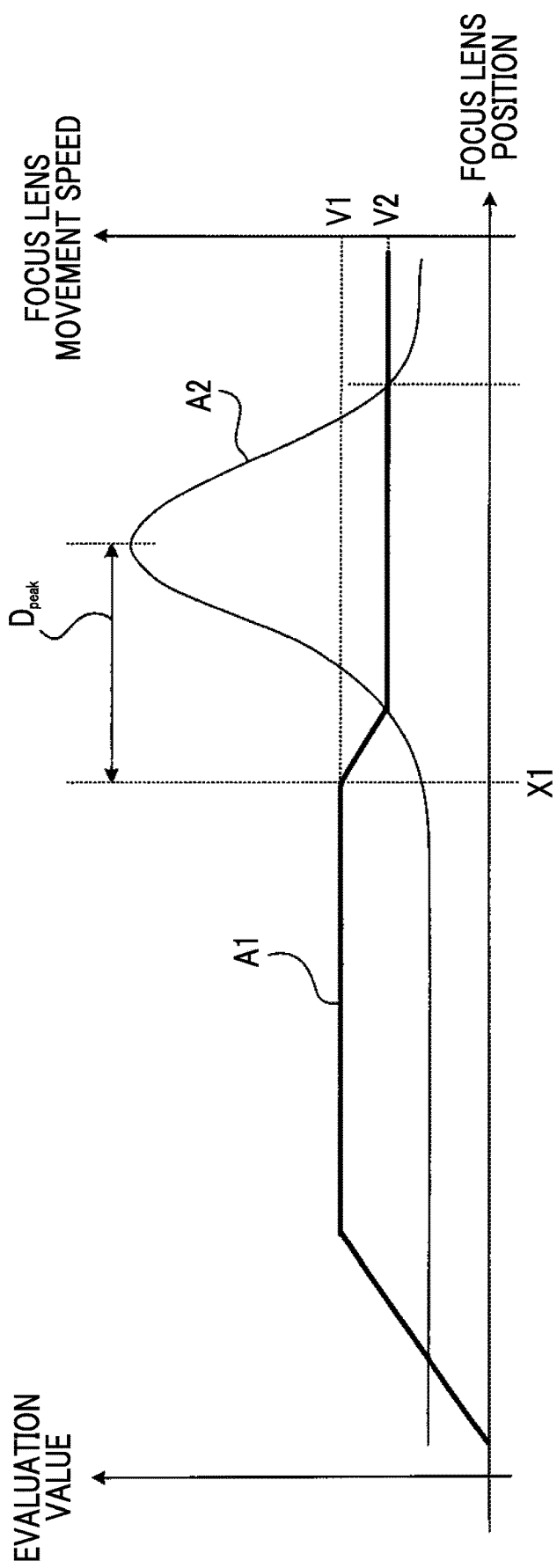
FIG. 3 is a graph showing an example of a change in movement speed of a focus lens at the time of acceleration and deceleration control.

FIG. 3 is a graph showing an example of a change in movement speed of the focus lens at the time of the acceleration and deceleration control.

In FIG. 3, a horizontal axis represents the position of the focus lens. A vertical axis on the left side in FIG. 3 represents the evaluation value calculated by the evaluation value calculation unit 111. A vertical axis on the right side in FIG. 3 represents the movement speed of the focus lens.

A reference A1 in FIG. 3 is a graph showing the relationship between the movement speed of the focus lens and the position of the focus lens. A reference A2 in FIG. 3 is a graph showing the relationship between the evaluation value and the position of the focus lens.

The search control unit 110 starts the movement of the focus lens from the reference position after moving the focus lens to a reference position (for example, a nearest end or an infinity end), and accelerates the movement speed of the focus lens up to a first movement speed V1.

In a case where the movement of the focus lens is started, the search control unit 110 monitors the evaluation value calculated by the evaluation value calculation unit 111, and determines whether or not a change in evaluation value is equal to or greater than a threshold value.

For example, in a case where a difference between an evaluation value calculated in a current position of the focus lens and an evaluation value calculated in a previous position of the current position of the focus lens is equal to or greater than a predetermined value, the search control unit 110 determines that the change in evaluation value is equal to or greater than the threshold value.

In the example of FIG. 3, the search control unit determines that the change in evaluation value is equal to or greater than the threshold value in a state in which the focus lens is present in a position X1.

In a case where it is determined that the change in evaluation value is equal to or greater than the threshold value, the search control unit 110 decelerates the movement speed of the focus lens up to a second movement speed V2. In a case where it is determined that the change in evaluation value is not equal to or greater than the threshold value, the search control unit 110 does not decelerate the movement speed of the focus lens.

As stated above, the search control unit 110 performs the acceleration and deceleration control by controlling the movement speed of the focus lens based on the evaluation value calculated by the evaluation value calculation unit 111.

The first movement speed V1 and the second movement speed V2 shown in FIG. 3 and a deceleration $a_{dec}$ (a value indicating the extent that the movement speed thereof decelerates per unit time) in a case where the movement speed of the focus lens decelerates are stored in the lens information storage unit 3, as the lens performance information.

As the second movement speed V2, a predetermined value is set within a range in which the number of evaluation values calculated by the evaluation value calculation unit 111 is able to secure focusing accuracy.

As the first movement speed V1, a predetermined value which is greater than the second movement speed and is smaller than a driving limit of the focus lens is set.

As the deceleration $a_{dec}$, a predetermined value is set such that the movement speed decelerates up to the second movement speed V2 from the first movement speed V1 before the evaluation value reaches a peak after the change in evaluation value which is equal to or greater than the threshold value is started.

A maximum frame rate $f_{acc}$ capable of being combined with the acceleration and deceleration control performed based on the first movement speed V1, the second movement speed V2, and the deceleration $a_{dec}$ is included in the lens performance information. The frame rate $f_{acc}$ constitutes second imaging performance information.

In the lens device 40, the acceleration and deceleration control is performed based on the first movement speed V1, the second movement speed V2, and the deceleration $a_{dec}$. Further, the evaluation values are calculated by reading out the captured image signals from the imaging element 5 according to the frame rate $f_{acc}$, and the target position is determined. Thus, a balance between a focusing speed and focusing accuracy can be in a best state.

Priority specification information Pmode indicating whether the combination of the frame rate fact with the acceleration and deceleration control or the combination of the frame rate which is greater than the frame rate fact with the constant speed control is preferentially performed is included in the lens performance information.

A movable range of the focus lens is not the same for any device type of lens device 40. Thus, in some lens devices, the balance between the focusing speed and the focusing performance may become better by performing the constant speed control at a frame rate greater than the frame rate $f_{acc}$, or the balance between the focusing speed and the focusing performance may become better by performing the acceleration and deceleration control.

For example, in a lens device having a narrow movable range of the focus lens, it does not take time to move the focus lens from the nearest end to the infinity end even though the movement speed of the focus lens is constant. Thus, in a case where the frame rate is high, the balance between the focusing speed and the focusing accuracy can be favorable even though the acceleration and deceleration control is not performed.

In a lens device having a wide movable range of the focus lens, it takes time to move the focus lens from the nearest end to the infinity end in a case where the constant speed control is performed. Thus, the balance between the focusing speed and the focusing accuracy can be favorable by performing the acceleration and deceleration control.

For this reason, the priority specification information Pmode depending on characteristics of the lens device is included in the lens performance information.

Figure 4:
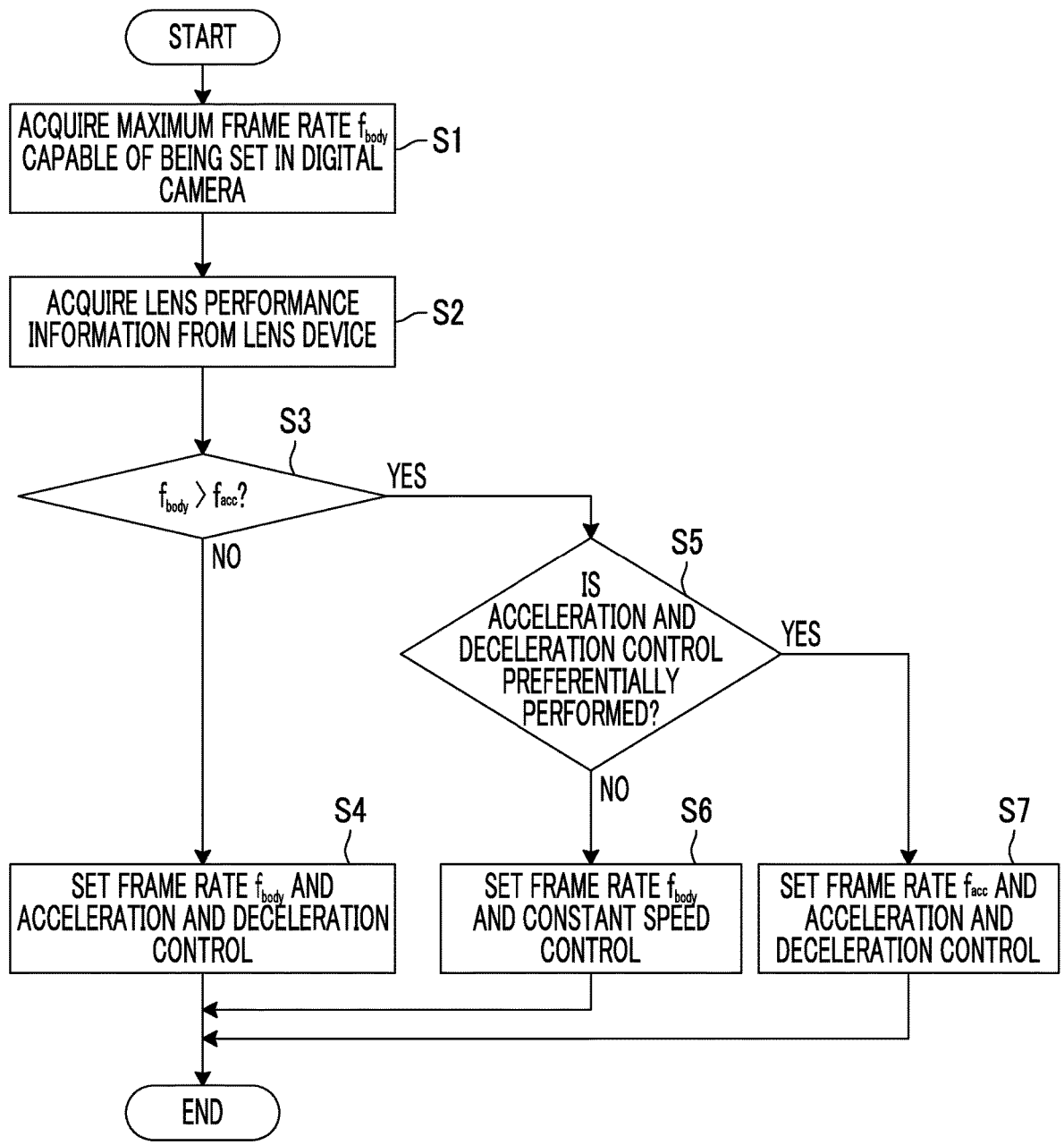
FIG. 4 is a flowchart for describing an operation of the system control unit 11 of the digital camera shown in FIG. 1.

FIG. 4 is a flowchart for describing an operation of the system control unit 11 of the digital camera shown in FIG. 1.

In a case where the lens device 40 is attached to the digital camera, the system control unit 11 acquires the maximum frame rate $f_{body}$ capable of being set in the digital camera from the storage unit 12 (step S1).

Subsequently, the lens information acquisition unit 114 of the system control unit 11 acquires the lens performance information including the frame rate $f_{acc}$ and the priority specification information Pmode from the lens device 40 (step S2).

Subsequently, the search control unit 110 determines whether or not the frame rate $f_{body}$ acquired in step S1 is greater than the frame rate $f_{acc}$ acquired in step S2 (step S3).

In a case where the frame rate $f_{body}$ is equal to less than the frame rate $f_{acc}$ (step S3: NO), the search control unit 110 sets the frame rate $f_{body}$ as the frame rate, and sets the acceleration and deceleration control as the driving control (step S4).

In a case where the frame rate $f_{body}$ is greater than the frame rate $f_{acc}$ (step S3: YES), the search control unit 110 determines whether or not the acceleration and deceleration control is preferentially performed while referring to the priority specification information Pmode acquired by the lens information acquisition unit 114 (step S5).

In a case where the priority specification information Pmode is information for specifying that the constant speed control is preferentially performed (step S5: NO), the search control unit 110 sets the frame rate $f_{body}$ as the frame rate, and sets the constant speed control as the driving control (step S6).

As the movement speed of the focus lens at the time of the constant speed control, the movement speed which is associated with the frame rate $f_{body}$ and is stored in the storage unit 12 in advance is used.

In a case where the priority specification information Pmode is information for specifying that the acceleration and deceleration control is preferentially performed (step S5: YES), the search control unit 110 sets the frame rate $f_{acc}$ as the frame rate, and sets the acceleration and deceleration control as the driving control (step S7).

After step S4, step S6, and step S7, in a case where an instruction to perform AF is received, the search control unit 110 moves the focus lens and causes the imaging element 5 to perform the motion picture imaging according to the frame rates and the driving control set in step S4, step S6, and step S7.

The evaluation values are calculated based on the captured image signals acquired during the motion picture imaging, and the target position of the focus lens is determined based on the evaluation value. The focusing control unit 113 moves the focus lens to the determined target position, and thus, the AF according to the instruction is ended.

As stated above, according to the digital camera of FIG. 1, it is possible to determine whether to perform the constant speed control or the acceleration and deceleration control and how to set the frame rate based on the lens performance information acquired from the lens device 40 and the frame rate $f_{body}$ stored in the storage unit 12.

In a case where the frame rate $f_{body}$ is equal to less than the frame rate $f_{acc}$ (step S3: NO), there is a possibility that sufficient performance will not be acquired in the combination of the constant speed control with the frame rate $f_{body}$ from the fact that the frame rate $f_{body}$ is low even in a case where the priority specification information Pmode specifies that the constant speed control is preferentially performed.

Thus, the focusing speed and the focusing accuracy can be the best by calculating the evaluation values in the combination of the acceleration and deceleration control with the frame rate $f_{body}$.

In a case where the frame rate $f_{body}$ is greater than the frame rate $f_{acc}$ (step S3: YES), the process of step S6 or step S7 is performed according to the priority specification information Pmode. Thus, the focusing speed and the focusing accuracy can be the best.

Since the lens device 40 is able to be attached to the digital camera, even in a case where the lens device 40 is replaced with another lens device, it is possible to set the combination of an optimum frame rate with driving control based on the lens performance information and the frame rate $f_{body}$.

Accordingly, it is possible to constantly realize the focusing control at a high speed with high accuracy irrespective of the combination of the lens device with the digital camera.

It has been described in the digital camera of FIG. 1 that the lens performance information stored in the lens device 40 includes the frame rate $f_{acc}$, the first movement speed V1, the second movement speed V2, and the deceleration $a_{dec}$.

However, the information items of the first movement speed V1, the second movement speed V2, and the deceleration $a_{dec}$ may be stored in the storage unit 12 of the digital camera in advance.

For example, the information items of the first movement speed V1, the second movement speed V2, and the deceleration $a_{dec}$ are stored in the storage unit 12 for each device type ID of the lens device 40.

In a case where the search control unit 110 of the system control unit 11 performs the acceleration and deceleration control, the acceleration and deceleration control may be performed based on the information items corresponding to the device type ID of the attached lens device 40.

Alternatively, only one set of the information items of the first movement speed V1, the second movement speed V2, and the deceleration $a_{dec}$ may be stored in the storage unit 12 irrespective of the device type ID of the lens device 40, and the search control unit 110 may perform the acceleration and deceleration control by using the set.

The information items of the first movement speed V1, the second movement speed V2, and the deceleration $a_{dec}$ are stored in the lens device 40, and thus, it is possible to perform the acceleration and deceleration control suitable for the lens device 40 even in a case where a new lens device 40 is released. It is not necessary to perform a task for storing the information items in the storage unit 12 of the digital camera, and it is possible to reduce manufacturing cost of the digital camera.

Hereinafter, modification examples of the digital camera shown in FIG. 1 will be described.

First Modification Example

Figure 5:
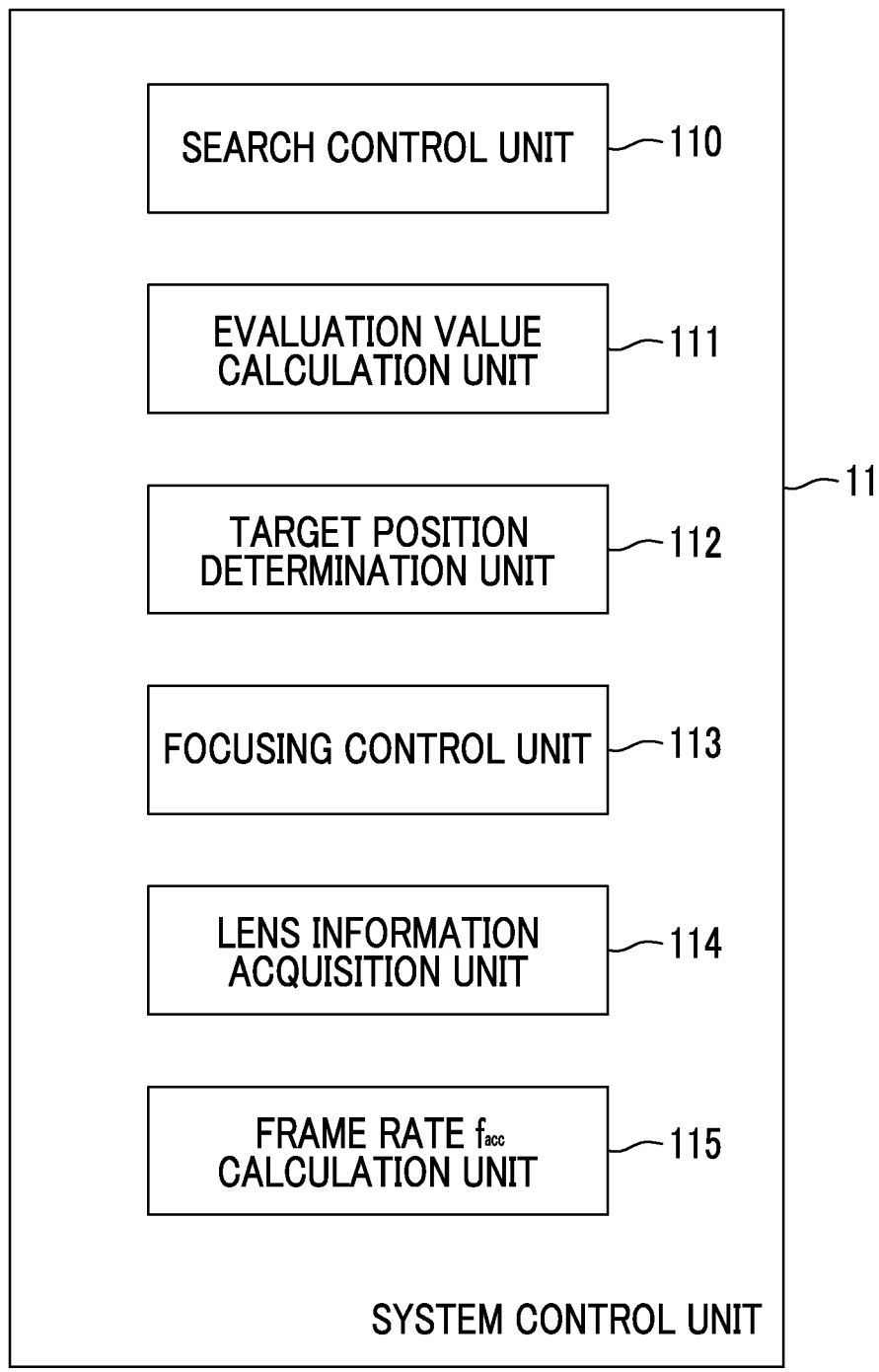
FIG. 5 is a diagram showing a modification example of a function block of a system control unit 11 shown in FIG. 2.

FIG. 5 is a diagram showing a modification example of a functional block of the system control unit 11 shown in FIG. 2.

The system control unit 11 shown in FIG. 5 is realized by adding a frame rate $f_{acc}$ calculation unit 115 constituting a maximum imaging performance information calculation unit to the system control unit 11 shown in FIG. 2. The frame rate $f_{acc}$ calculation unit 115 is formed by the focusing control program being executed by the processor.

Filter characteristic information of the filtering process performed in a case where the evaluation value calculation unit 111 calculates the evaluation values is further stored in the storage unit 12 of the digital camera according to the first modification example.

The filter characteristic information corresponds to a movement distance (distance $D_{peak}$ of FIG. 3) of the focus lens until the evaluation value reaches the peak after the change in evaluation value in the graph A2 shown in FIG. 3 which is equal to or greater than the threshold value is started.

In the first modification example, the lens performance information stored in the lens information storage unit 3 of the lens device 40 does not include the frame rate $f_{acc}$. In addition to the priority specification information Pmode, the first movement speed V1, the second movement speed V2, and the deceleration $a_{dec}$, the lens performance information includes a movement amount $f_{mh}$ of the focus lens allowed during a one frame period in a case where the focus lens moves at the first movement speed V1, a movement amount $f_m$ of the focus lens allowed during one frame period in a case where the focus lens moves at the second movement speed V2, and a delay time $t_{delay}$ until the deceleration of the focus lens is actually started after an instruction to decelerate the movement speed of the focus lens is received from the system control unit 11 of the digital camera.

The movement amount $f_{mh}$ of the focus lens, the movement amount $f_m$ of the focus lens, the deceleration $a_{dec}$, and the delay time $t_{delay}$ constitute control information indicating driving ability of the focus lens in a case where the acceleration and deceleration control is performed.

The frame rate $f_{acc}$ calculation unit 115 calculates the maximum frame rate $f_{acc}$ at which the acceleration and deceleration control is able to be performed in the lens device 40 based on the control information acquired from the lens device 40 and the filter characteristic information stored in the storage unit 12.

Specifically, the frame rate $f_{acc}$ calculation unit 115 calculates the frame rate $f_{acc}$ by substituting the movement amount $f_{mh}$ of the focus lens acquired from the lens device 40, the movement amount $f_m$ of the focus lens, the deceleration $a_{dec}$, the delay time $t_{delay}$, the filter characteristic information (distance $D_{peak}$) acquired from the storage unit 12 into Expression (2) obtained by solving Expression (1) for the frame rate $f_{acc}$.

The units of the movement amount $f_{mh}$ of the focus lens, the movement amount $f_m$ of the focus lens, and the distance $D_{peak}$ are "m" (meters). The unit of the delay time $t_{delay}$ is "s" (seconds). The unit of the deceleration $a_{dec}$ is "m/s$^2$". The unit of the frame rate $f_{acc}$ is "1/s".

$$\left(\frac{f_{mh} - f_m}{1/f_{acc}}\right)^2 = 2a_{dec}\left(D_{peak} - \frac{f_{mh}}{1/f_{acc}} t_{delay}\right) \quad \text{Expression (1)}$$

$$f_{acc} = -2a_{dec} f_{mh} t_{delay} + \sqrt{\frac{(2a_{dec} f_{mh} t_{delay})^2 +}{8(f_{mh} - f_m)^2 a_{dec} D_{peak}}} \quad \text{Expression (2)}$$

As mentioned above, in the first modification example, it is assumed that the maximum frame rate $f_{acc}$ at which the acceleration and deceleration control is able to be performed in the lens device 40 is acquired through the calculation.

In the first modification example, the priority specification information Pmode included in the lens performance information is information indicating whether to preferentially perform the combination of the frame rate $f_{acc}$ acquired through the calculation with the acceleration and deceleration control or the combination of the imaging performance information which is greater than the frame rate $f_{acc}$ acquired through the calculation with the constant speed control.

Figure 6:
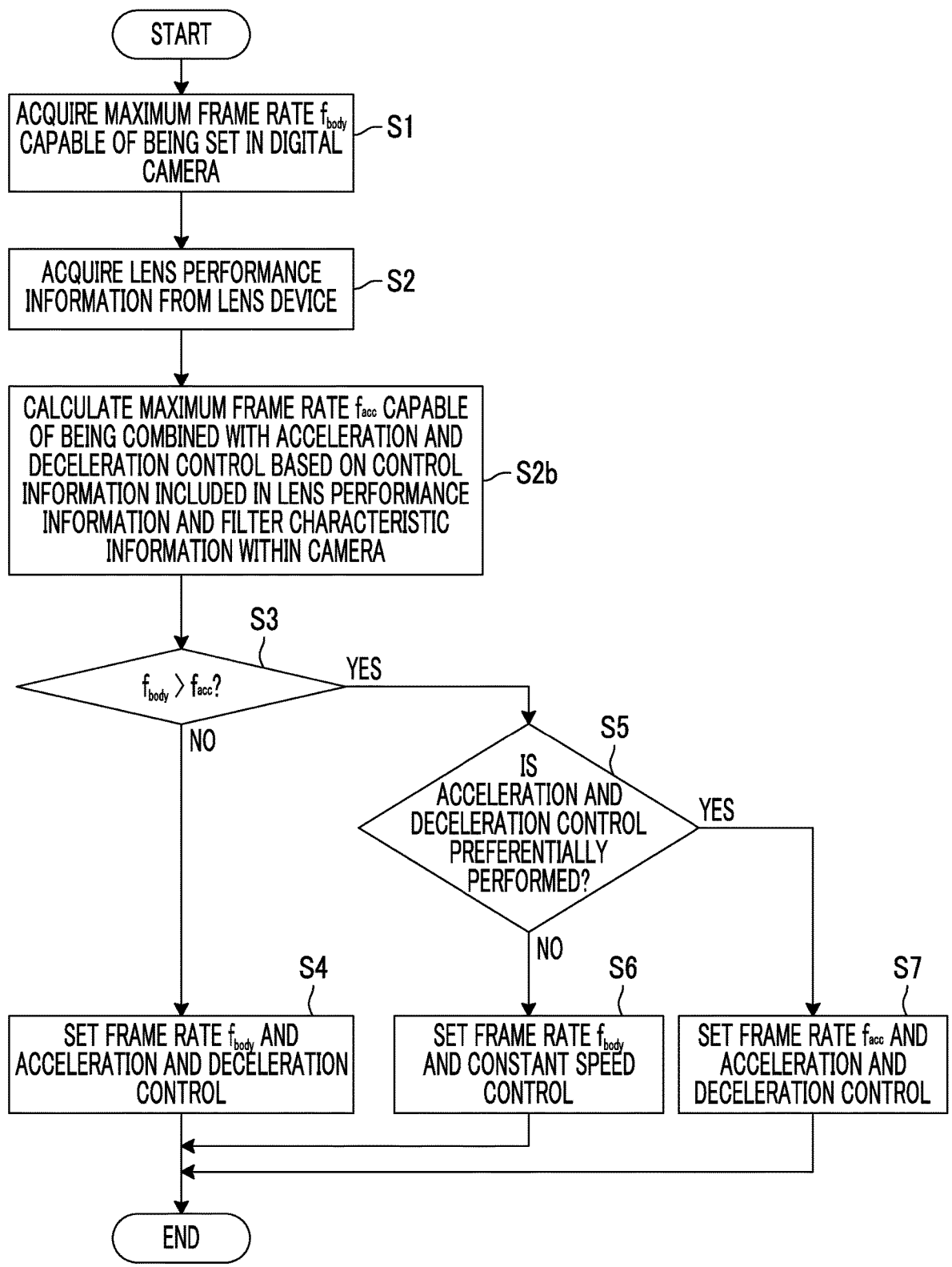
FIG. 6 is a flowchart for describing an operation of a system control unit 11 of a digital camera according to a first modification example.

FIG. 6 is a flowchart for describing an operation of the system control unit 11 of the digital camera according to the first modification example. The flowchart shown in FIG. 6 is realized by adding step S2b between step S2 and step S3 in the flowchart shown in FIG. 4.

After step S2, the frame rate $f_{acc}$ calculation unit 115 calculates the frame rate $f_{acc}$ based on the control information included in the lens performance information acquired in step S2 and the filter characteristic information stored in the storage unit 12 (step S2b). Thereafter, step S3 and the subsequent processes are performed.

As stated above, in accordance with the digital camera according to the first modification example, it is possible to calculate the frame rate $f_{acc}$ suitable for the combination of the lens device 40 with the digital camera even in a case where the lens device 40 is replaced.

Thus, it is possible to accurately calculate the frame rate $f_{acc}$, and it is possible to accurately determine whether to perform which process of step S4 to step S7. As a result, it is possible to perform the focusing control at a high speed with high accuracy.

In the digital camera according to the first modification example, it is assumed that the lens performance information stored in the lens device 40 includes the first movement speed V1, the second movement speed V2, the movement amount $f_{mh}$ of the focus lens, the movement amount $f_m$ of the focus lens, the deceleration $a_{dec}$, and the delay time $t_{delay}$.

However, the information items of the first movement speed V1, the second movement speed V2, the movement amount $f_{mh}$ of the focus lens, the movement amount $f_m$ of the focus lens, and the deceleration $a_{dec}$ may be stored in the storage unit 12 of the digital camera in advance.

For example, the information items of the first movement speed V1, the second movement speed V2, the movement amount $f_{mh}$ of the focus lens, the movement amount $f_m$ of the focus lens, and the deceleration $a_{dec}$ are stored in the storage unit 12 for each device type ID of the lens device 40.

The frame rate $f_{acc}$ calculation unit 115 of the system control unit 11 may calculate the frame rate $f_{acc}$ based on the information corresponding to the device type ID of the attached lens device 40, the filter characteristic information stored in the storage unit 12, and the delay time $t_{delay}$ acquired from the lens device 40.

The search control unit 110 may perform the acceleration and deceleration control based on the first movement speed V1, the second movement speed V2, and the deceleration $a_{dec}$ included in the information corresponding to the device type ID of the attached lens device 40.

Second Modification Example

Although it has been described above that the priority specification information Pmode is included in the lens performance information, the lens performance information may not include the priority specification information Pmode. The operation of the system control unit 11 in this case will be described.

Figure 7:
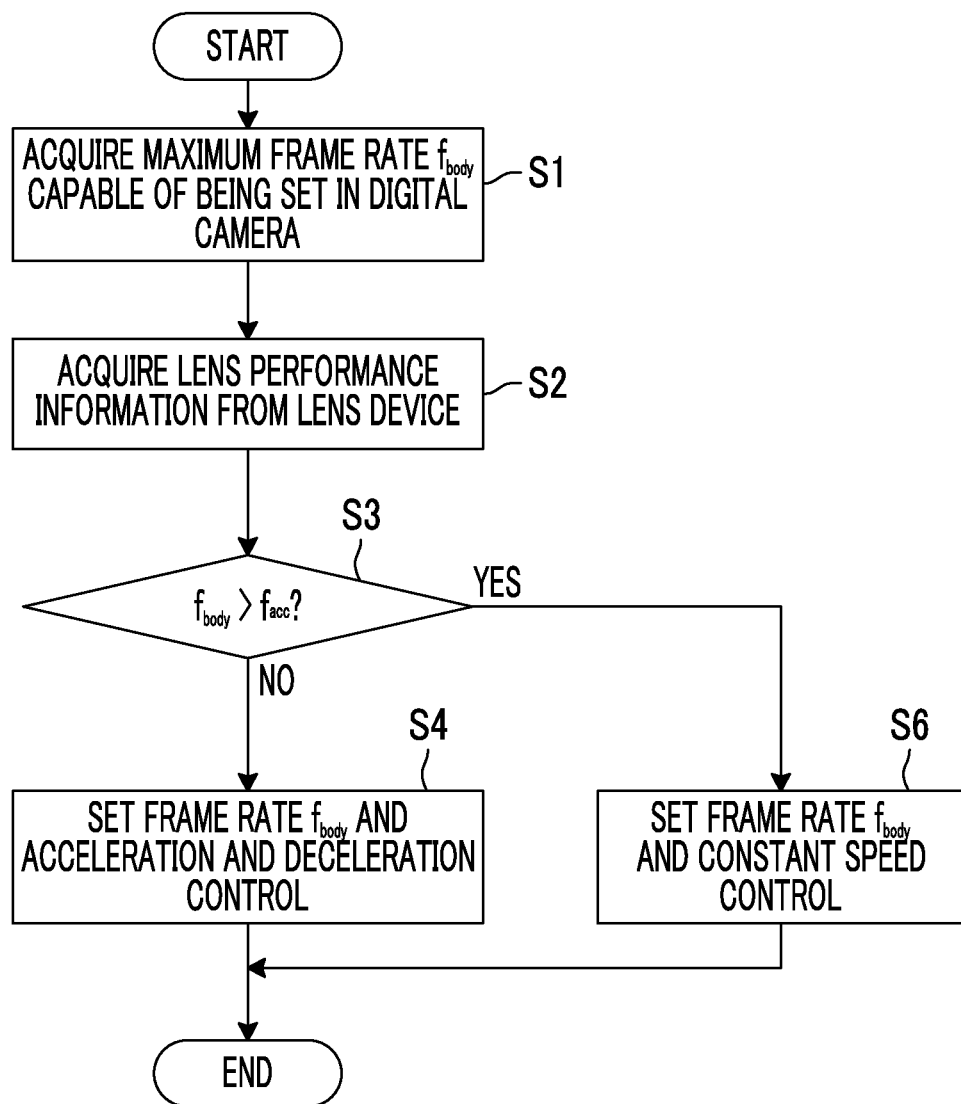
FIG. 7 is a flowchart for describing an operation of a system control unit 11 of a digital camera according to a second modification example.

FIG. 7 is a flowchart for describing an operation of a system control unit 11 of a digital camera according to the second modification example. The flowchart shown in FIG. 7 is realized by removing step S5 and step S7 in the flowchart shown in FIG. 4 and performing step S6 in a case where the determination result of step S3 is YES.

For example, in a case where it is assumed that the lens device 40 is a short-focus lens and the frame rate $f_{body}$ is greater than the frame rate $f_{acc}$, it is possible to determine the target position at a high speed with high accuracy in the combination of the frame rate $f_{body}$ with the constant speed control compared to the combination of the frame rate $f_{acc}$ with the acceleration and deceleration control.

In a case where the frame rate $f_{body}$ is sufficiently greater than the frame rate $f_{acc}$ even though it is assumed that the lens device 40 is a long-focus lens, it is possible to determine the target position at a high speed with high accuracy in the combination of the frame rate $f_{body}$ with the constant speed control compared to the combination of the frame rate $f_{acc}$ with the acceleration and deceleration control.

As stated above, it is possible to achieve both the focusing speed and the focusing accuracy even in the operation shown in FIG. 7.

Third Modification Example

A third modification example is realized by applying the second modification example to the first modification example.

Figure 8:
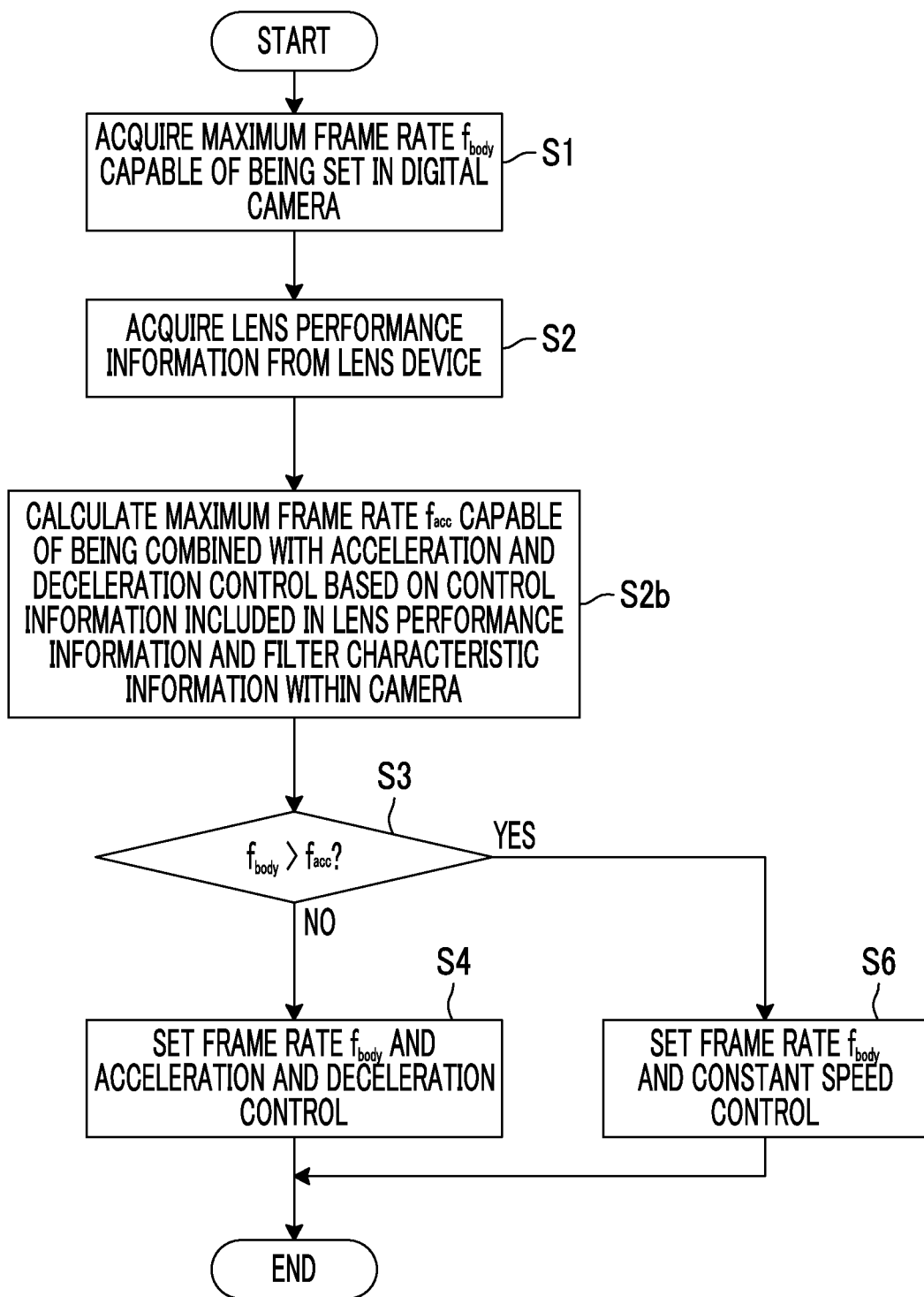
FIG. 8 is a flowchart for describing an operation of a system control unit 11 of a digital camera according to a third modification example.

FIG. 8 is a flowchart for describing an operation of a system control unit 11 of a digital camera according to the third modification example.

The flowchart shown in FIG. 8 is realized by removing step S5 and step S7 in the flowchart shown in FIG. 6 and performing step S6 in a case where the determination result of step S3 is YES.

For example, in a case where it is assumed that the lens device 40 is a short-focus lens and the frame rate $f_{body}$ is greater than the frame rate $f_{acc}$, it is possible to determine the target position at a high speed with high accuracy in the combination of the frame rate $f_{body}$ with the constant speed control compared to the combination of the frame rate $f_{acc}$ with the acceleration and deceleration control.

In a case where the frame rate $f_{body}$ is sufficiently greater than the frame rate $f_{acc}$ even though it is assumed that the lens device 40 is a long-focus lens, it is possible to determine the target position at a high speed with high accuracy in the combination of the frame rate $f_{body}$ with the constant speed control compared to the combination of the frame rate $f_{acc}$ with the acceleration and deceleration control.

As mentioned above, it is possible to achieve both the focusing speed and the focusing accuracy even in the operation shown in FIG. 8.

It has been described above that the frame rate is used as the imaging performance information of the digital camera. However, the imaging performance information may be a reciprocal of the frame rate, that is, a time (one frame period) required to acquire one captured image signal (one frame).

Hereinafter, a configuration of a smartphone as the imaging device will be described.

Figure 9:
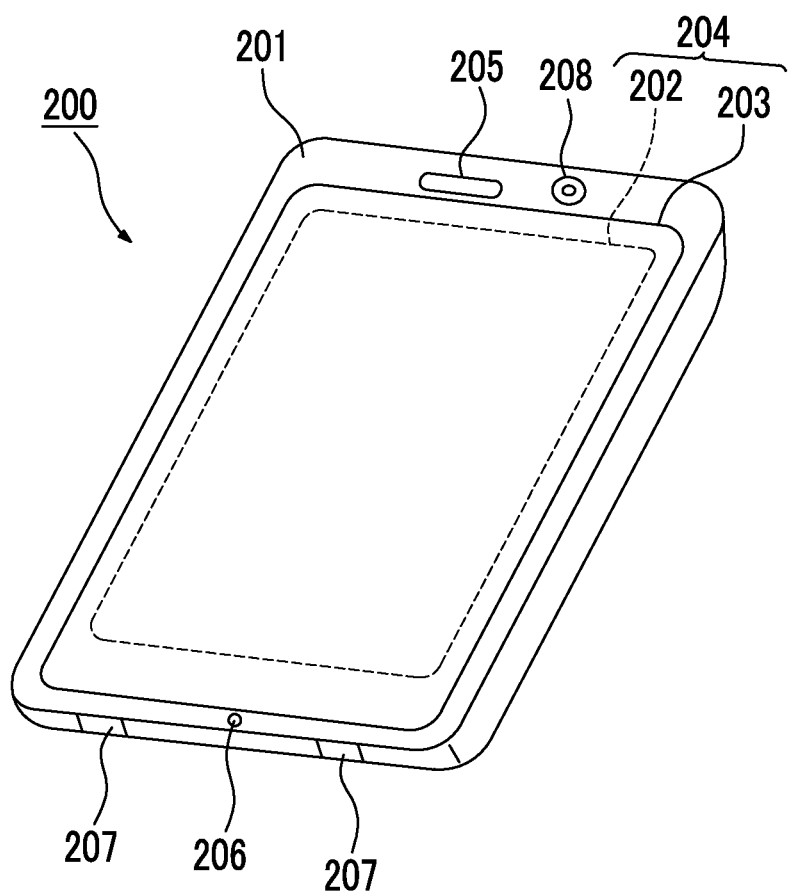
FIG. 9 shows the appearance of a smartphone which is an embodiment of an imaging device of the invention.

FIG. 9 shows the appearance of a smartphone 200 which is an embodiment of an imaging device of the invention. The smartphone 200 shown in FIG. 9 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208. The configuration of the housing 201 is not limited thereto, and for example, a configuration in which the display unit and the input unit are independent from each other may be employed, or a configuration having a folding structure or a slide mechanism may be employed.

Figure 10:
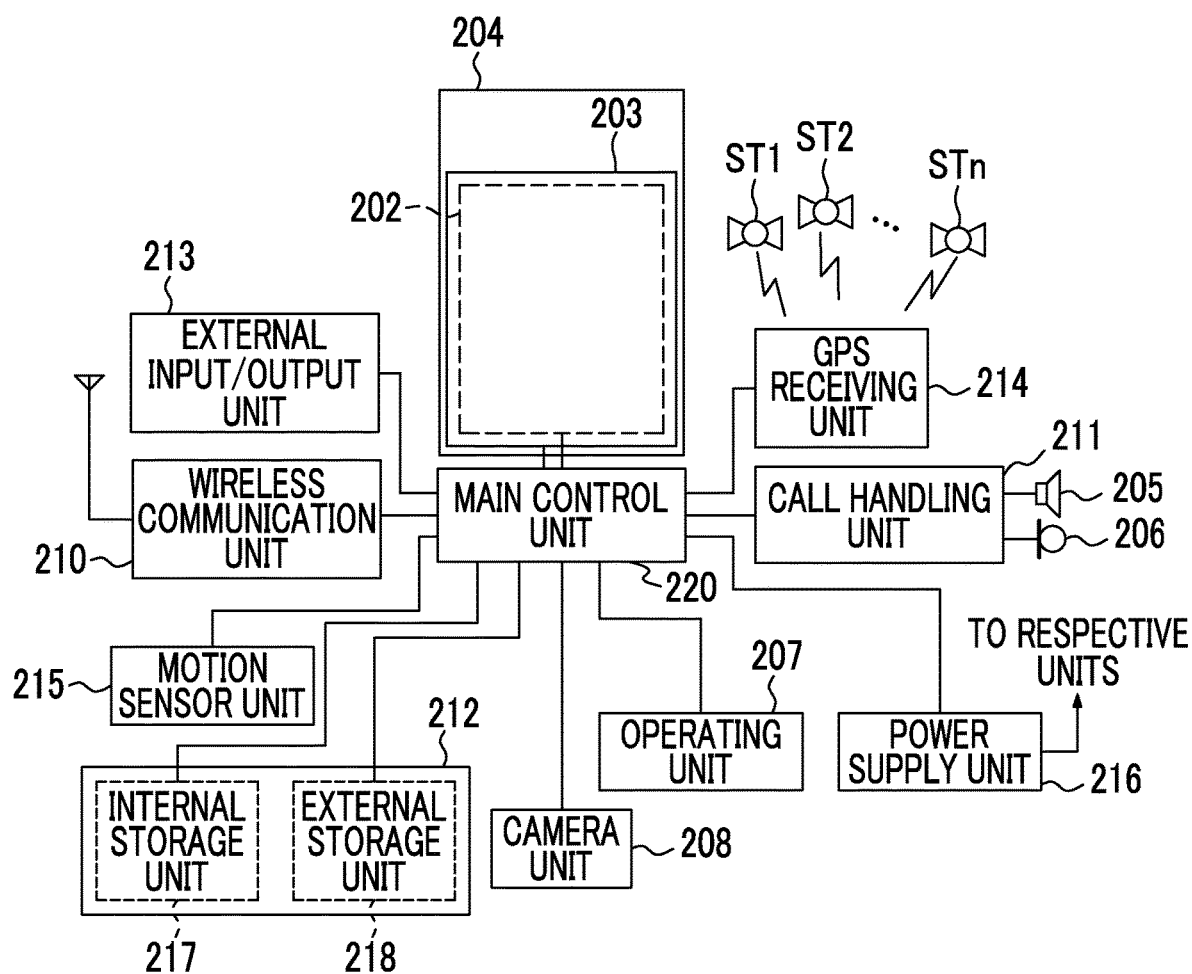
FIG. 10 is an internal block diagram of the smartphone of FIG. 9.

FIG. 10 is a block diagram showing the configuration of the smartphone 200 shown in FIG. 9. As shown in FIG. 10, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main control unit 220. Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to an instruction of the main control unit 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OELD), or the like, as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 10, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both of the size of the display region and the size of the display panel. The operation panel 203 may include two sensitive regions including an outer edge portion and an inner portion other than the outer edge portion. The width of the outer edge portion is appropriately designed according to the size of the housing 201 or the like.

As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts voice of the user input through the microphone 206 to voice data processable in the main control unit 220 and outputs voice data to the main control unit 220, or decodes voice data received by the wireless communication unit 210 or the external input/output unit 213 and outputs voice from the speaker 205.

As shown in FIG. 9, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 9, the operating unit 207 is a push button-type switch which is mounted on the side surface of the housing 201 of the smartphone 200, and is turned on by being depressed with a finger or the like and is turned off by restoration force of the panel or the like in a case where the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory.

The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (Infrared Data Association: IrDA) (Registered Trademark), Ultra Wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, an earphone connected in a wired or wireless manner, and the like. The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail.

The scroll bar refers to a software key for receiving an instruction to move a display portion of an image which is too large to fit into the display region of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory control unit 20, the recording medium 21, the display control unit 22, the display unit 23, and the operating unit 14 in the digital camera shown in FIG. 1.

Captured image data generated by the camera unit 208 can be recorded in the storage unit 212 or can be output through the external input/output unit 213 or the wireless communication unit 210.

In the smartphone 200 shown in FIG. 9, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main control unit or the like) acquired by the microphone 206, posture information acquired by the motion sensor unit 215, or the like and can be recorded in the storage unit 212, or may be output through the external input/output unit 213 or the wireless communication unit 210.

In the smartphone 200 having the above-described configuration, it is also possible to perform the subject tracking AF with high accuracy.

As described above, the following matters are disclosed in this specification.

Disclosed is an imaging device to which a lens device including a focus lens capable of moving in an optical axis direction is detachably attached. The imaging device comprises an imaging element that images a subject through the focus lens, a search control unit that acquires captured image signals by causing the imaging element to image the subject for each position of the focus lens while moving the focus lens, an evaluation value calculation unit that calculates evaluation values for determining a target position of the focus lens based on the captured image signals, a target position determination unit that determines the target position of the focus lens based on the evaluation values, a focusing control unit that moves the focus lens to the target position, a storage unit that stores first imaging performance information indicating the number of captured image signals read out per unit time in a case where the captured image signals are continuously read out from the imaging element or a reading interval in a case where the captured image signals are read out, and a lens information acquisition unit that acquires lens performance information indicating focusing performance of the focus lens from the lens device. The search control unit selectively performs any one of acceleration and deceleration control such that a movement speed of the focus lens is decelerated after the movement speed is accelerated and constant speed control such that the movement speed of the focus lens is constant by controlling the movement speed based on the evaluation values, based on the lens performance information and the first imaging performance information.

In the disclosed imaging device, the lens performance information includes maximum second imaging performance information capable of being combined with the acceleration and deceleration control.

In the disclosed imaging device, the lens performance information further includes priority specification information indicating whether to preferentially perform a combination of the second imaging performance information with the acceleration and deceleration control or a combination of imaging performance information greater than the second imaging performance information with the constant speed control.

In the disclosed imaging device, the lens performance information includes control information indicating driving ability of the focus lens in a case where the acceleration and deceleration control is performed, the evaluation value calculation unit performs a filtering process on the captured image signals, and calculates the evaluation values based on signals acquired through the filtering process, and the imaging device further includes a maximum imaging performance information calculation unit that calculates maximum second imaging performance information with which the acceleration and deceleration control is able to be performed based on the control information acquired from the lens device and filter characteristic information of the filtering process.

In the disclosed imaging device, the lens performance information further includes priority specification information indicating whether to preferentially perform a combination of the maximum second imaging performance information with which the acceleration and deceleration control is able to be performed with the acceleration and deceleration control or a combination of imaging performance information greater than the maximum second imaging performance information with the constant speed control.

In the disclosed imaging device, the control information includes a movement amount of the focus lens allowed during one frame period of the focus lens at the time of the acceleration and deceleration control, a deceleration at which the focus lens is decelerated, and a delay time to when the deceleration of the focus lens is started from when an instruction to start the deceleration of the focus lens is received from the imaging device.

In the disclosed imaging device, the search control unit drives the imaging element and performs the acceleration and deceleration control according to the first imaging performance information in a case where the first imaging performance information is equal to or less than the second imaging performance information, and determines whether to drive the imaging element and perform the acceleration and deceleration control according to the second imaging performance information or to drive the imaging element and perform the constant speed control according to the first imaging performance information based on the priority specification information in a case where the first imaging performance information exceeds the second imaging performance information.

Disclosed is a focusing control method using an imaging device to which a lens device including a focus lens capable of moving in an optical axis direction is detachably attached and which has an imaging element which images a subject through the focus lens. The method comprises a search control step of acquiring captured image signals by causing the imaging element to image the subject for each position of the focus lens while moving the focus lens, an evaluation value calculation step of calculating evaluation values for determining a target position of the focus lens based on the captured image signals, a target position determination step of determining the target position of the focus lens based on the evaluation values, a focusing control step of moving the focus lens to the target position, and a lens information acquisition step of acquiring lens performance information indicating focusing performance of the focus lens from the lens device. In the search control step, any one of acceleration and deceleration control such that a movement speed of the focus lens is decelerated after the movement speed is accelerated and constant speed control such that the movement speed of the focus lens is constant is selectively performed by controlling the movement speed based on the evaluation values, based on the lens performance information and first imaging performance information stored in a storage unit within the imaging device which stores imaging performance information indicating the number of captured image signals read out per unit time in a case where the captured image signals are continuously read out from the imaging element or a reading interval of the captured image signals.

In the disclosed focusing control method, the lens performance information includes maximum second imaging performance information capable of being combined with the acceleration and deceleration control.

In the disclosed focusing control method, the lens performance information further includes priority specification information indicating whether to preferentially perform a combination of the second imaging performance information with the acceleration and deceleration control or a combination of imaging performance information greater than the second imaging performance information with the constant speed control.

In the disclosed focusing control method, the lens performance information includes control information indicating driving ability of the focus lens in a case where the acceleration and deceleration control is performed, in the evaluation value calculation step, a filtering process is performed on the captured image signals, and the evaluation values are calculated based on signals acquired through the filtering process, and the focusing control method further includes a maximum imaging performance information calculation step of calculating maximum second imaging performance information with which the acceleration and deceleration control is able to be performed based on the control information acquired from the lens device and filter characteristic information of the filtering process.

In the disclosed focusing control method, the lens performance information further includes priority specification information indicating whether to preferentially perform a combination of the maximum second imaging performance information with which the acceleration and deceleration control is able to be performed with the acceleration and deceleration control or a combination of imaging performance information greater than the maximum second imaging performance information with the constant speed control.

In the disclosed focusing control method, the control information includes a movement amount of the focus lens allowed during one frame period of the focus lens at the time of the acceleration and deceleration control, a deceleration at which the focus lens is decelerated, and a delay time to when the deceleration of the focus lens is started from when an instruction to start the deceleration of the focus lens is received from the imaging device.

In the disclosed focusing control method, in the search control step, the imaging element is driven and the acceleration and deceleration control is performed according to the first imaging performance information in a case where the first imaging performance information is equal to or less than the second imaging performance information, and it is determined whether to drive the imaging element and perform the acceleration and deceleration control according to the second imaging performance information or to drive the imaging element and perform the constant speed control according to the first imaging performance information based on the priority specification information in a case where the first imaging performance information exceeds the second imaging performance information.

Disclosed is a focusing control program causing a computer included in an imaging device to which a lens device including a focus lens capable of moving in an optical axis direction is detachably attached and which has an imaging element which images a subject through the focus lens to function as a search control unit that acquires captured image signals by causing the imaging element to image the subject for each position of the focus lens while moving the focus lens, an evaluation value calculation unit that calculates evaluation values for determining a target position of the focus lens based on the captured image signals, a target position determination unit that determines the target position of the focus lens based on the evaluation values, a focusing control unit that moves the focus lens to the target position, and a lens information acquisition unit that acquires lens performance information indicating focusing performance of the focus lens from the lens device. The search control unit selectively performs any one of acceleration and deceleration control such that a movement speed of the focus lens is decelerated after the movement speed is accelerated and constant speed control such that the movement speed of the focus lens is constant by controlling the movement speed based on the evaluation values, based on the lens performance information and imaging performance information stored in a storage unit within the imaging device which stores imaging performance information indicating the number of captured image signals read out per unit time in a case where the captured image signals are continuously read out from the imaging element or a reading interval of the captured image signals.

The invention is applied to, in particular, a digital camera or the like, thereby achieving high convenience and effectiveness.

Although the invention has been described above by a specific embodiment, the invention is not limited to the embodiment, and various modifications may be made without departing from the technical spirit of the invention disclosed herein. This application is based on Japanese Patent Application (JP2015-249618), filed Dec. 22, 2015, the content of which is incorporated herein.

EXPLANATION OF REFERENCES

1: imaging lens
2: stop
3: lens information storage unit
4: lens control unit
5: imaging element
6: analog signal processing unit
7: analog-to-digital conversion circuit
8: lens drive unit
9: stop drive unit
10: imaging element drive unit
11: system control unit
12: storage unit
14: operating unit
15: memory control unit
16: main memory
17: digital signal processing unit
18: compression/expansion processing unit
20: external memory control unit
21: recording medium 22: display control unit
23: display unit
24: control bus
25: data bus
110: search control unit
111: evaluation value calculation unit
112: target position determination unit
113: focusing control unit
114: lens information acquisition unit
115: frame rate $f_{acc}$ calculation unit
200: smartphone
201: housing
202: display panel
203: operation panel
204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main control unit
ST1 to STn: GPS satellite

What is claimed is:

1. An imaging device comprising:
a lens comprising a focus lens capable of moving in an optical axis direction;
an imaging element imaging a subject through the focus lens;
a processor, configured to:
control the focus lens and the imaging element to acquire captured image signals by causing the imaging element to image the subject for each position of the focus lens while moving the focus lens;
calculate evaluation values for determining a target position of the focus lens based on the captured image signals;
determine the target position of the focus lens based on the evaluation values;
acquire lens performance information indicating focusing performance of the focus lens from the lens,
wherein one of acceleration and deceleration control are selectively performed such that a movement speed of the focus lens is decelerated after the movement speed is accelerated and constant speed control such that the movement speed of the focus lens is constant by controlling the movement speed based on the evaluation values, the lens performance information, and imaging performance information indicating a number of captured image signals read out per unit time in a case where the captured image signals are continuously read out from the imaging element or a reading interval of the captured image signals so as to move the focus lens to the target position.

2. The imaging device according to claim 1,
wherein the lens performance information comprises maximum second imaging performance information capable of being combined with the acceleration and deceleration control.

3. The imaging device according to claim 2,
wherein the lens performance information further comprises priority specification information indicating whether to preferentially perform a combination of the second imaging performance information with the acceleration and deceleration control or a combination of imaging performance information being greater than the second imaging performance information with the constant speed control.

4. The imaging device according to claim 3,
wherein the processor drives the imaging element and performs the acceleration and deceleration control according to the first imaging performance information in a case where the first imaging performance information is equal to or less than the second imaging performance information, and
determines whether to drive the imaging element and perform the acceleration and deceleration control according to the second imaging performance information or to drive the imaging element and perform the constant speed control according to the first imaging performance information based on the priority specification information in a case where the first imaging performance information exceeds the second imaging performance information.

5. The imaging device according to claim 1,
wherein the lens performance information comprises control information indicating driving ability of the focus lens in a case where the acceleration and deceleration control is performed,
the processor performs a filtering process on the captured image signals, and calculates the evaluation values based on signals acquired through the filtering process, and
the processor further calculates maximum second imaging performance information with which the acceleration and deceleration control is able to be performed based on the control information acquired from the lens and filter characteristic information of the filtering process.

6. The imaging device according to claim 5,
wherein the lens performance information further comprises priority specification information indicating whether to preferentially perform a combination of the maximum second imaging performance information with which the acceleration and deceleration control is able to be performed with the acceleration and deceleration control or a combination of imaging performance information being greater than the maximum second imaging performance information with the constant speed control.

7. The imaging device according to claim 6,
wherein the control information comprises a movement amount of the focus lens allowed during one frame period of the focus lens at a time of the acceleration and deceleration control, a deceleration at which the focus lens is decelerated, and a delay time to when the deceleration of the focus lens is started from when an instruction to start the deceleration of the focus lens is received from the imaging device.

8. The imaging device according to claim 6,
wherein the processor drives the imaging element and performs the acceleration and deceleration control according to the first imaging performance information in a case where the first imaging performance information is equal to or less than the second imaging performance information, and determines whether to drive the imaging element and perform the acceleration and deceleration control according to the second imaging performance information or to drive the imaging element and perform the constant speed control according to the first imaging performance information based on the priority specification information in a case where the first imaging performance information exceeds the second imaging performance information.

9. The imaging device according to claim 5, wherein the control information comprises a movement amount of the focus lens allowed during one frame period of the focus lens at a time of the acceleration and deceleration control, a deceleration at which the focus lens is decelerated, and a delay time to when the deceleration of the focus lens is started from when an instruction to start the deceleration of the focus lens is received from the imaging device.

10. A focusing control method using an imaging device having a lens comprising a focus lens capable of moving in an optical axis direction and having an imaging element which images a subject through the focus lens, the method comprising:
   a search control step of controlling the focus lens and the imaging element to acquire captured image signals by causing the imaging element to image the subject for each position of the focus lens while moving the focus lens;
   an evaluation value calculation step of calculating evaluation values for determining a target position of the focus lens based on the captured image signals;
   a target position determination step of determining the target position of the focus lens based on the evaluation values; and
   a lens information acquisition step of acquiring lens performance information indicating focusing performance of the focus lens from the lens,
   wherein, in the search control step, one of acceleration and deceleration control such that a movement speed of the focus lens is decelerated after the movement speed is accelerated and constant speed control such that the movement speed of the focus lens is constant is selectively performed by controlling the movement speed based on the evaluation values, the lens performance information, and first imaging performance information indicating a number of captured image signals read out per unit time in a case where the captured image signals are continuously read out from the imaging element or a reading interval of the captured image signals so as to move the focus lens to the target position.

11. The focusing control method according to claim 10, wherein the lens performance information comprises maximum second imaging performance information capable of being combined with the acceleration and deceleration control.

12. The focusing control method according to claim 11, wherein the lens performance information further comprises priority specification information indicating whether to preferentially perform a combination of the second imaging performance information with the acceleration and deceleration control or a combination of imaging performance information being greater than the second imaging performance information with the constant speed control.

13. The focusing control method according to claim 12, wherein, in the search control step, the imaging element is driven and the acceleration and deceleration control is performed according to the first imaging performance information in a case where the first imaging performance information is equal to or less than the second imaging performance information, and
   whether to drive the imaging element and perform the acceleration and deceleration control according to the second imaging performance information or to drive the imaging element and perform the constant speed control according to the first imaging performance information is determined based on the priority specification information in a case where the first imaging performance information exceeds the second imaging performance information.

14. The focusing control method according to claim 10, wherein the lens performance information comprises control information indicating driving ability of the focus lens in a case where the acceleration and deceleration control is performed,
   in the evaluation value calculation step, a filtering process is performed on the captured image signals, and the evaluation values are calculated based on signals acquired through the filtering process, and
   the focusing control method further comprises a maximum imaging performance information calculation step of calculating maximum second imaging performance information with which the acceleration and deceleration control is able to be performed based on the control information acquired from the lens and filter characteristic information of the filtering process.

15. The focusing control method according to claim 14, wherein the lens performance information further comprises priority specification information indicating whether to preferentially perform a combination of the maximum second imaging performance information with which the acceleration and deceleration control is able to be performed with the acceleration and deceleration control or a combination of imaging performance information being greater than the maximum second imaging performance information with the constant speed control.

16. The focusing control method according to claim 15, wherein the control information comprises a movement amount of the focus lens allowed during one frame period of the focus lens at a time of the acceleration and deceleration control, a deceleration at which the focus lens is decelerated, and a delay time to when the deceleration of the focus lens is started from when an instruction to start the deceleration of the focus lens is received from the imaging device.

17. The focusing control method according to claim 15, wherein, in the search control step, the imaging element is driven and the acceleration and deceleration control is performed according to the first imaging performance information in a case where the first imaging performance information is equal to or less than the second imaging performance information, and
   whether to drive the imaging element and perform the acceleration and deceleration control according to the second imaging performance information or to drive the imaging element and perform the constant speed control according to the first imaging performance information is determined based on the priority specification information in a case where the first imaging performance information exceeds the second imaging performance information.

18. The focusing control method according to claim 14, wherein the control information comprises a movement amount of the focus lens allowed during one frame period of the focus lens at a time of the acceleration and deceleration control, a deceleration at which the focus lens is decelerated, and a delay time to when the deceleration of the focus lens is started from when an instruction to start the deceleration of the focus lens is received from the imaging device.

19. A non-transitory computer readable medium storing a focusing control program causing a computer included in an imaging device having a lens comprising a focus lens capable of moving in an optical axis direction and having an imaging element which images a subject through the focus lens to:
control the focus lens and the imaging element to acquire captured image signals by causing the imaging element to image the subject for each position of the focus lens while moving the focus lens;
calculate evaluation values for determining a target position of the focus lens based on the captured image signals;
determine the target position of the focus lens based on the evaluation values;
acquire lens performance information indicating focusing performance of the focus lens from the lens,
wherein one of acceleration and deceleration control are selectively performed such that a movement speed of the focus lens is decelerated after the movement speed is accelerated and constant speed control such that the movement speed of the focus lens is constant by controlling the movement speed based on the evaluation values, the lens performance information, and imaging performance information indicating a number of captured image signals read out per unit time in a case where the captured image signals are continuously read out from the imaging element or a reading interval of the captured image signals so as to move the focus lens to the target position.

* * * * *